United States Patent
Hrle et al.

(10) Patent No.: US 7,912,838 B2
(45) Date of Patent: Mar. 22, 2011

(54) SYSTEM AND METHOD FOR PERFORMING JUST-IN-TIME PRIMING OF A DATABASE CACHE

(75) Inventors: Namik Hrle, Boeblingen (DE); James Zu-Chia Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 11/303,714

(22) Filed: Dec. 16, 2005

(65) Prior Publication Data
US 2006/0230013 A1 Oct. 12, 2006

(30) Foreign Application Priority Data
Apr. 7, 2005 (EP) ..................................... 05102734

(51) Int. Cl.
*G06F 7/00* (2006.01)
*G06F 17/30* (2006.01)
*G06F 17/00* (2006.01)
(52) U.S. Cl. .................. 707/736; 707/750; 707/796
(58) Field of Classification Search .................. 707/2, 8; 711/137; 709/244
See application file for complete search history.

(56) References Cited

U.S. PATENT DOCUMENTS

| | | | | |
|---|---|---|---|---|
| 5,758,146 A * | 5/1998 | Schiefer et al. | ................ | 707/2 |
| 5,778,353 A * | 7/1998 | Schiefer et al. | ................ | 707/2 |
| 5,842,196 A * | 11/1998 | Agarwal et al. | ................ | 707/2 |
| 6,195,653 B1 * | 2/2001 | Bleizeffer et al. | ............ | 707/2 |
| 6,470,330 B1 * | 10/2002 | Das et al. | ..................... | 707/2 |
| 6,772,139 B1 * | 8/2004 | Smith, III | ........................ | 1/1 |
| 2006/0041550 A1 * | 2/2006 | Bennett et al. | ................ | 707/5 |

* cited by examiner

*Primary Examiner* — Susan Y Chen
(74) *Attorney, Agent, or Firm* — Kunzler Needham Massey & Thorpe

(57) ABSTRACT

A system for retrieving stored data and/or index pages, receives a database request, generates an access plan for the database request for accessing data rows and/or index entries according to the statement, and generates a priming process by selecting a set of data and/or index pages. The set of data and/or index pages is a super-set or the exact set of the pages needed for accessing data rows and/or index entries according to the access plan. The present system retrieves the data and/or index pages of the set before executing the database request according to the access plan. The execution of the database request is performed by scanning the index and data pages preloaded into the cache. This reduces the number of necessary disk reads during execution.

14 Claims, 6 Drawing Sheets

SYSTEM AND METHOD FOR PERFORMING JUST-IN-TIME PRIMING OF A DATABASE CACHE

PRIORITY CLAIM

The present application claims the priority of European patent application titled "Just-In-Time Priming of a Database Cache," Serial No. 05102734.0, filed on Jul. 4, 2005, which is incorporated herein in its entirety.

FIELD OF THE INVENTION

The present invention generally relates to database management systems and more particularly to enhancing the performance of database management systems.

BACKGROUND OF THE INVENTION

Computer databases are a common mechanism for storing information on computer systems while providing easy access to users. A typical database is an organized collection of related information stored as rows having fields of information. As an example, a database of employees may have a row for each employee comprising different columns or fields such as name, department, phone number, salary, etc. Rows are organized in a table, a two-dimensional structure with rows indicating the rows having fields of information and columns indicating the fields.

To accelerate access to the data of the database table, rows can be indexed and the index entered into a database index. For example, one index can indicate where to find the rows containing a particular name, another index can indicate where to find the rows containing specific departments.

Especially in relational database systems, the indexes are arranged as trees to allow a query to be less time-consuming.

Rows and indexes are physically stored on storage media such as, for example, tapes or disks. When performing any operation on the database such as, for example, processing a query, inserting a new row, indexing a new row, etc., the corresponding data is retrieved from the storage medium into a cache or buffer unit where a database management system can perform the operation on the data while the data is in the cache.

Database operations such as queries, updates, and deletes involve scanning entries and data rows of the database tables to determine which of the entries and data rows constitute a result set of the operation. The scanning occurs within the database management system, typically in the database cache. The index entries and data rows are brought into the cache from external storage, typically disk or tape subsystems. As the speed of reading from the external storage is much slower than other processes that are involved in executing database operations, the overall performance is in most cases heavily influenced by the numbers of reads from the external storage.

Existing database management systems employ various techniques for reducing the number of external storage reads. These techniques comprise, for example, using very large database caches, optimizing the data residency times, or reading data in advance whenever a sequential pattern of accesses is expected or detected.

The sequential pattern of accesses occurs when the data that are to be read into the database cache reside in storage medium blocks that are close to each other. Two blocks are considered close to each other when they can be read in a single storage read operation.

Reading the data in this fashion is so efficient that virtually all commercialized database management systems provide a means of storing table data rows in the sequence or close to the sequence of one of the indexes of the table. This process is often called "clustering rows" according to a selected index. Some database management systems attempt to maintain the clustering while inserting new rows and provide for periodic reorganization when there is not enough free space within the existing data to accommodate random inserts. Some database management systems utilize periodic reorganization, which speeds up insert processing but slows down queries until the data is reorganized.

Although this technology has proven to be useful, it would be desirable to present additional improvements. Many queries do not have a sequential access pattern. Accessing data through any other index but clustering is typically random and only occasionally results in some degree of "sequentiality". Furthermore, the queries that can take advantage of the sequential access heavily depend on regular data reorganizations. The reorganization is an obtrusive operation that is expensive in terms of resources usage and introduces a degree of contention into the system. The reorganization typically requires attention of a database administrator, which is difficult in environments comprising many data tables.

What is therefore needed is a system, a computer program product, and an associated method for a just-in-time priming of a database cache. To increase the efficiency of data read operations, 'priming' of the cache is often used as a key concept in the cache management. Most database management systems use some kind of priming such as, for example, through sequential prefetch. The need for such a solution has heretofore remained unsatisfied.

SUMMARY OF THE INVENTION

The present invention satisfies this need, and presents a system, a computer program product, and an associated method (collectively referred to herein as "the system" or "the present system") for just-in-time priming of a database cache.

A database management system comprises the present system. The database management system manages a database storing a database table comprising data pages. Each data page is capable of storing data rows that store information. The database table has a database index for logically ordering the data rows. The database index comprises index pages. Each index page is capable of storing index entries wherein each data row is referenced by a corresponding index entry. The data pages and the index pages are arranged to be stored on and retrieved from a storage medium.

The present system comprises a method for retrieving stored data and/or index pages. The present system receives a database request, generates an access plan for the database request for accessing data rows and/or index entries according to the statement, and generates a priming process by selecting a set of data and/or index pages. The set of data and/or index pages is a super-set or the exact set of the pages needed for accessing data rows and/or index entries according to the access plan. The present system retrieves the data and/or index pages of the set before executing the database request according to the access plan.

With help of the present invention, the pages containing the data rows and/or index entries needed for processing a database request, such as a query request or other, are retrieved, e.g., brought into the database cache before they are accessed by the database operation. By doing so, the pages needed are already available for further processing, without the need for additional storage medium reads, thus substantially speeding up and enhancing the performance of the database management system.

For each applicable database operation, the present system generates a priming process that runs ahead of the subject operation and retrieves the needed pages, e.g., brings them into the database cache. The priming process improves performance of all operations, regardless of the actual access plan for the subject operation. Furthermore, the need for reorganizations due to a deteriorating clustering ratio is eliminated. The insert process can be made faster by the present system because the need for clustering the data at insert time is in many cases removed.

The priming process is optimized for making the necessary pages available, but does not perform other operations such as scanning, predicate evaluation, locking, etc. The priming process generates an optimal result set that may be different from an original result set.

The present invention provides an improved priming process that is specific for each individual query. The priming process is generated when the originating statement is optimized. The priming process brings the needed data into the cache even if the data is not stored sequentially. Consequently, the priming process 'primes' the cache for the specific statement.

The present system may retrieve the data and/or index pages of the set and execute the database request at least partly in parallel. If the execution process waits for the priming process to complete, time may be wasted and the probability is higher that pages made available are removed due to any concurrent process.

The database management system has access to a cache, and the data and/or index pages selected by the priming process are read into the cache to make the selected pages available.

To further enhance the performance of the database management system, the occurrence of sequential patterns of pages is taken into account by the priming process. Furthermore, the present system may take into account any other performance enhancement techniques.

The execution of the database request is performed by scanning the data and/or index pages retrieved by the priming process and, in case the needed data and/or index page is not found, by retrieving additional pages according to the generated access path. The needed data and/or index page may not be found if the executing of the database request "overtakes" the priming process or pages are not available, e.g., due to concurrent processes. The present system retrieves pages according to the access plan only when the pages are not available. If the execution process overtakes the priming process, it is typically more efficient to wait until the priming process "catches up" with the execution process.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
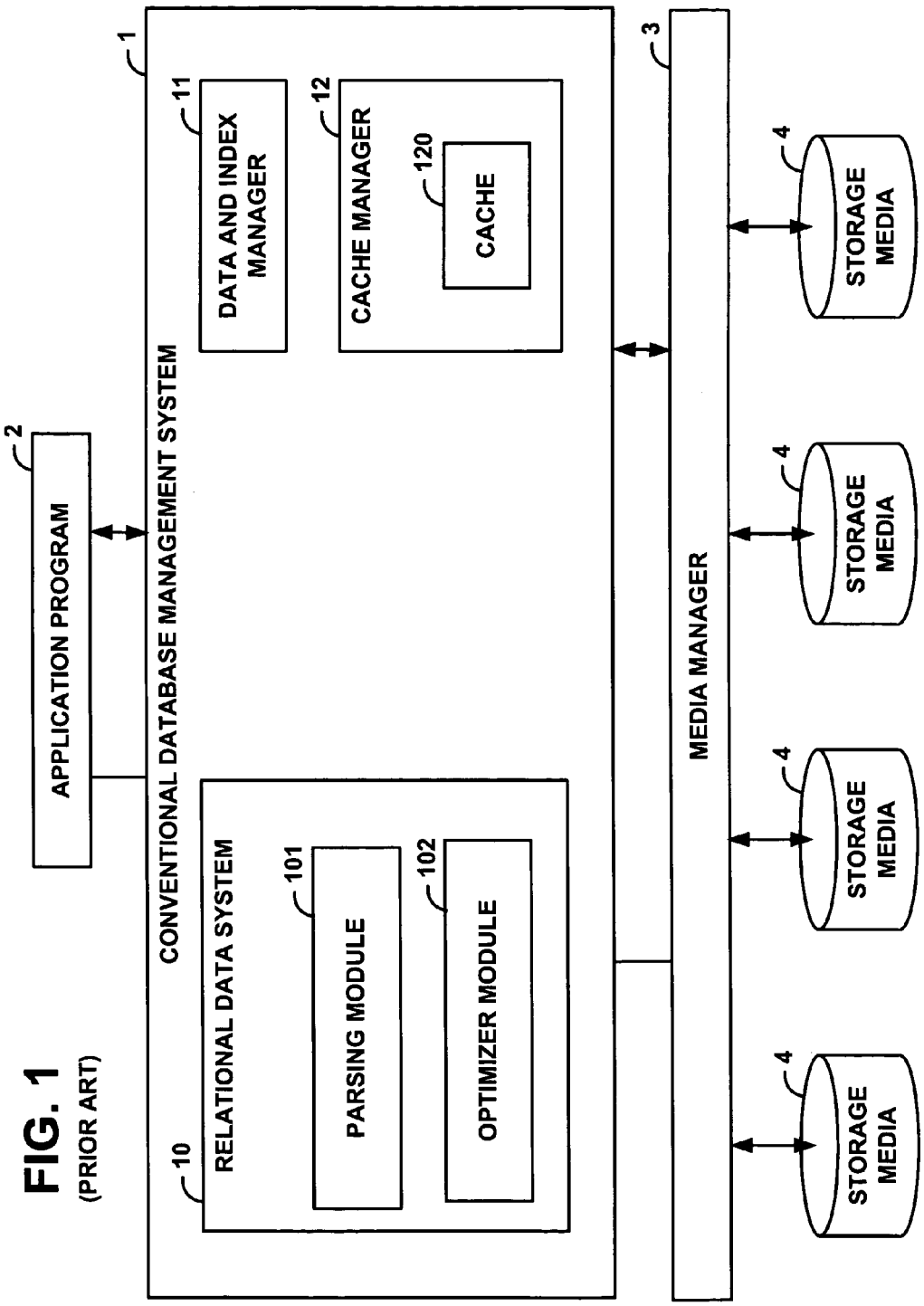
FIG. 1 is a diagram schematically illustrating a conventional database management system.

FIG. 1 illustrates schematically a conventional database management system 1. The conventional database management system 1 may be implemented, for example, as a computer with an appropriate computer program product running on it. The computer may be a stand-alone device or be a member of a network with servers and clients.

Database requests, or in the present example, query statements coming from an application program 2 or interactive user are processed by the conventional database management system 1, which comprises a number of components. Those components relevant in the present context are illustrated in FIG. 1.

The conventional database management device 1 comprises a relational data system 10, a data and index manager 11 and a cache manager 12. The conventional database management device 1 interacts with the application program 2 or interactive user by receiving query statements such as, for example, SQL statements. These query statements may be, for example, "insert", "read", "select", "delete", etc. and result in retrieval of stored data. In response to the query statements from the application program 2, the conventional database management device 1 returns information on rows of a database table and status information. The conventional database management system 1 may also receive information on rows to add.

Data, such as the content of the database table and a database index, is stored on storage media 4, such as disks or tapes. To store and retrieve data, the conventional database management system 1 uses the cache manager 12. The cache manager 12 manages the cache 120, for example arranged as buffer pools, and communicates with the media manager 3 by sending read or write page requests and receiving data and index pages. Pages, also called blocks, are entities corresponding to the physical blocks of the storage media 4 containing the data of the database. Pages are provided by the media manager 3 by communicating with the storage media 4 via I/O programs addressing the physical blocks.

The relational data system 10 comprises a parsing module 101 for parsing the query statements. Before a query statement such as, for example, a SQL statement is executed, the query statement needs to be "optimized". Optimizing is the process of determining how the tables addressed by the query statement are going to be accessed. The optimizer module 102 performs optimizing. The result of the optimization process is referenced as an access plan.

Based on this access plan, the data and index manager 11 scans the appropriate database rows and returns those that qualify back to the conventional database management system 1 and to the application program 2 or user. To scan the data rows, the blocks of data or data pages need to be brought into the cache 120 (also referenced as buffer pools). This is done by the cache manager 12, which communicates with the media manager 3 that accesses the underlying storage media 4.

The overall performance of the conventional database management system 1 is in most cases heavily influenced by the numbers of reads from the storage media 4, as the speed of reading from the storage media 4 is much slower than other processes that are involved in executing database operations.

To reduce the average number of reads from the storage media 4, the conventional database management system 1 is modified to include the present invention. This modification provides a capability to pre-select a superset of all pages necessary for executing a database request received from the application program 2 or a user. This pre-selected set of pages containing index entries and/or data rows determines a set of pages to be provided for scanning.

Figure 2:
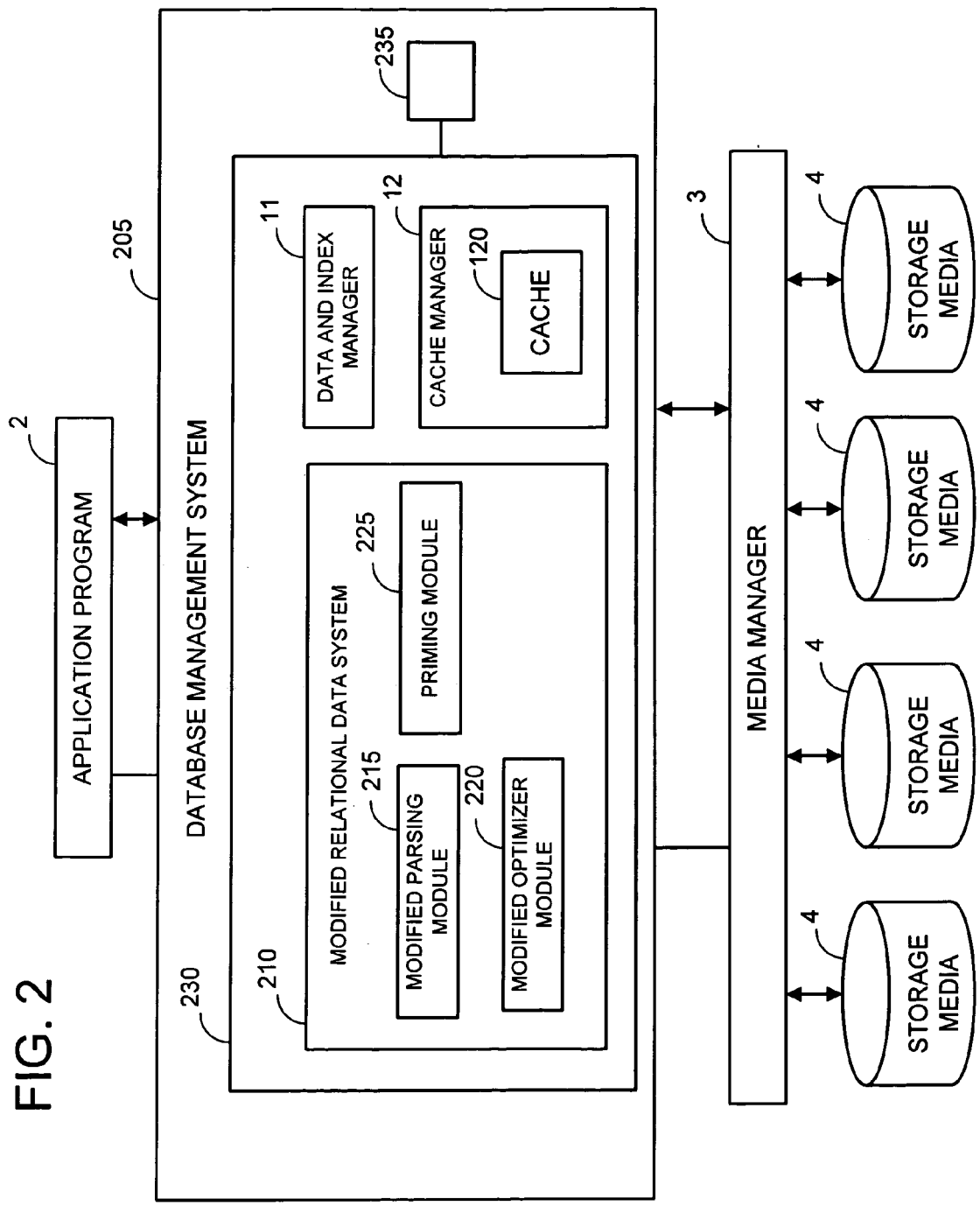
FIG. 2 is a diagram schematically illustrating a database management system according to the present invention.

A database management system 205 according to the present invention is schematically illustrated in FIG. 2. Compared with the conventional database management system 1 shown in FIG. 1, the database management system 205 of FIG. 2 is modified, in particular with respect to a modified relational data system 210 stored on a memory 230. The modified relational data system 210 comprises a modified parsing module 215, a modified optimizer module 220, and a priming module 225. The modified optimizer module 220 and the modified parsing module 215 are adapted to cooperate with the priming module 225. The database managemnt system 205 also contains a processor 235 configured to execute computational instructions.

The present invention can be implemented in the form of an entirely hardware embodiment, an entirely software embodiment, or an embodiment containing both hardware and software elements. In one embodiment, the invention is implemented in software, which includes but is not limited to firmware, resident software, microcode, etc.

Alternatively, the present invention can be implemented in the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, or a semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The priming module 225 selects a set of pages, all or at least some of the selected pages containing data, i.e., data rows and/or index entries, that are needed for executing the database operation. These pages are a superset or eventually the exact set of the pages containing the data rows and/or index entries to be accessed according to the access plan of the modified optimizer module 220. The priming module 225 generates an access plan for accessing these pages. In other embodiments of the present invention, the priming module 225 is realized as subcomponent of the modified optimizer module 220.

The access plan of the priming module 225 is communicated to the cache manager 12. The cache manager 12 cooperates with the media manager 3 to read the respective pages into cache 120. This process may be initiated slightly before the executing of the query statement according to the conventional access plan. By doing so, the probability is very high that the data rows to be scanned according to the conventional access plan by the data and index manager 11 are found on a page already in the cache 120. In case the executing process "overtakes" the priming process of the priming module 225, the executing process waits for the priming process to catch up. If the relevant page is not in the cache 120, e.g., due to concurrent processes, the relevant page is read into the cache 120 as in operation by the conventional database management system. 1 Thus, the number of storage medium reads necessary for executing a query statement is substantially reduced.

Different aspects of the invention are also illustrated in the following flowcharts.

Figure 3:
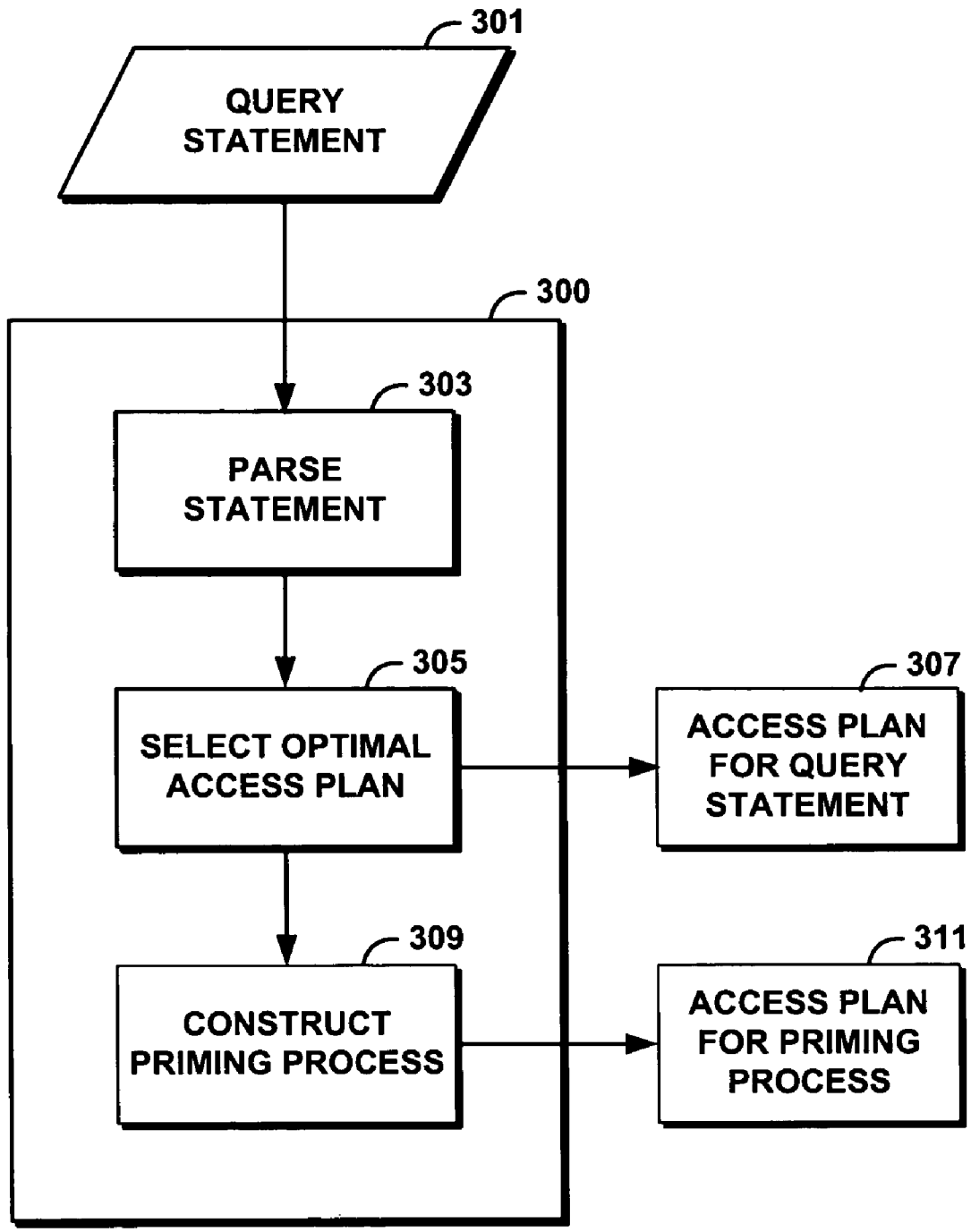
FIG. 3 is a process flowchart illustrating a method for access plan generation by the present invention.

FIG. 3 shows a method 300 of the modified optimizer module 220 in generating access plans, where the parsing and the priming are performed by the modified optimizer module 220. In the present case, a query statement (step 301) is parsed (step 303). Based on the parsing result, the modified optimizer module 220 generates an access plan for the query statement (steps 305 and 307) according to methods that are available or well known to the person skilled in the art, and constructs the priming process (step 309) and an access plan for the priming process (step 311).

According to the invention, the modified optimizer module 220 generates a priming process. The modified optimizer module 220 generates an optimal access path that ensures an efficient retrieval of the required set of data rows and/or index entries (also called result set). The modified optimizer module 220 further generates a priming process that efficiently brings into the cache 120 the pages that contain the result set. The result of this query statement is a set of pages comprising a superset of pages that contain the resulting rows.

As simple example, consider a table T(C1, C2, C3, C4 . . . ) with an index X(C2, C3). The operation according to the SQL-statement received from an application program is

SELECT * FROM T WHERE C2=? AND C3>? AND C4>C5 ORDER BY C1

The priming operation for this statement is:

SELECT * FROM T WHERE C2=? AND C3>?.

The priming operation does not return any row to the application and thus is not linked with the application communication area. The priming process brings into the cache 120 the index and data pages, where the data rows and index entries with C2=? and C3>? reside. The priming operation can take advantage of any performance improving technique such as, for example, reading in advance when a sequential pattern is detected.

Figure 4:
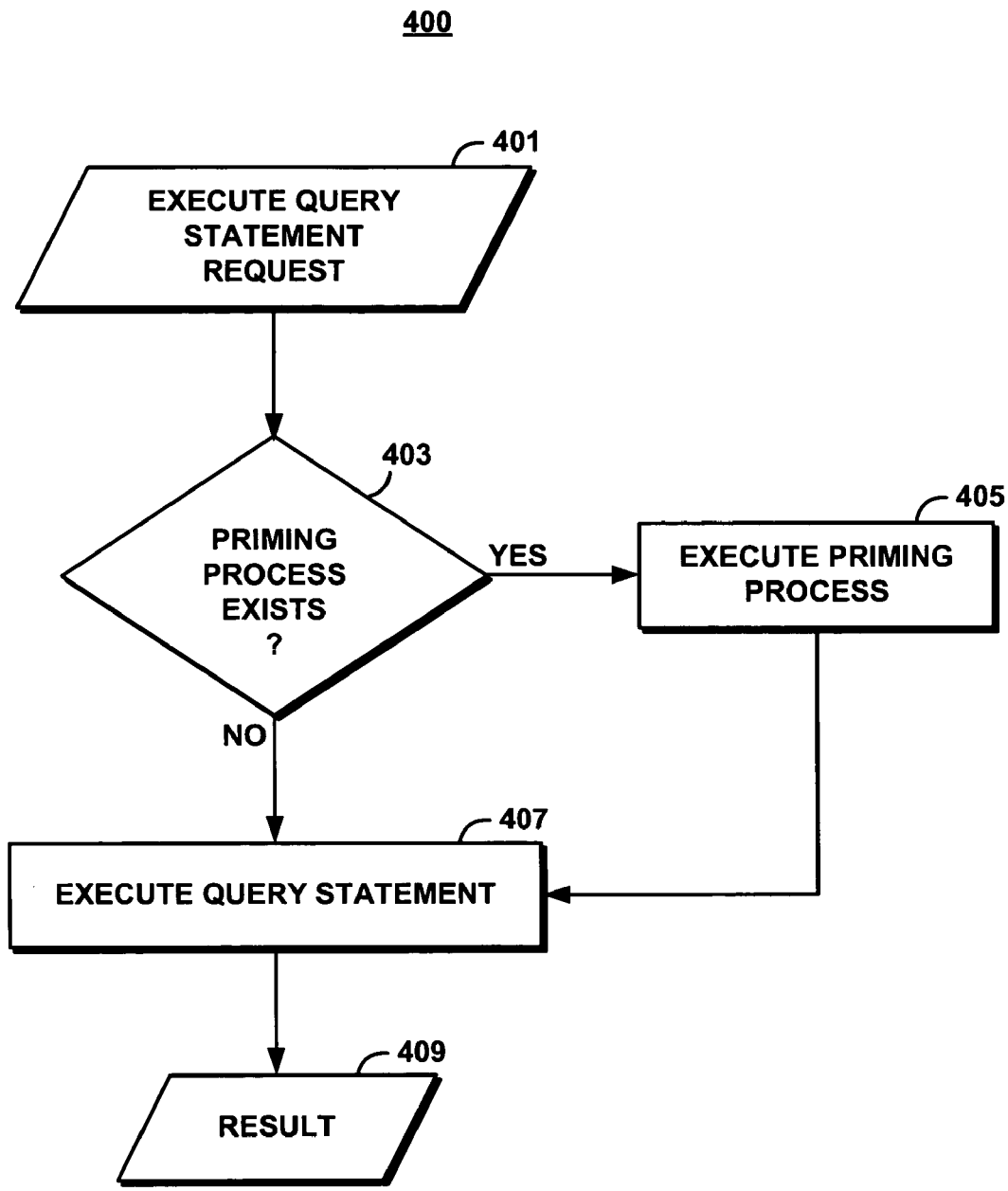
FIG. 4 is a process flowchart illustrating a method for query statement execution utilizing the present invention.

FIG. 4 illustrates a method 400 of the database management system 105 in executing a query statement. The database management system 205 receives an "execute query statement request" (step 401). The database management 205 determines whether a priming process of the priming module 225 exists for the query statement request (decision step 403). If such a priming process exists, the database management system 205 executes the priming process (step 405). Concurrent with execution of the priming process in step 405, the database management system 205 executes the query statement (step 407), generating a result (step 409). For the most part, the priming process and query statement execution process generally run in parallel. The priming process brings data into the cache 120 and the query statement execution process scans the data.

If the scanning process is faster than the priming process of the priming module 225 and needs a page that has not yet been brought into cache 120, the scanning process waits for the priming process to read the desired page. If the priming process is much faster than the query statement execution and a page brought already into the cache 120 is replaced by some other concurrent activity, the query statement execution reads the desired page back into the cache 120.

Figure 5:
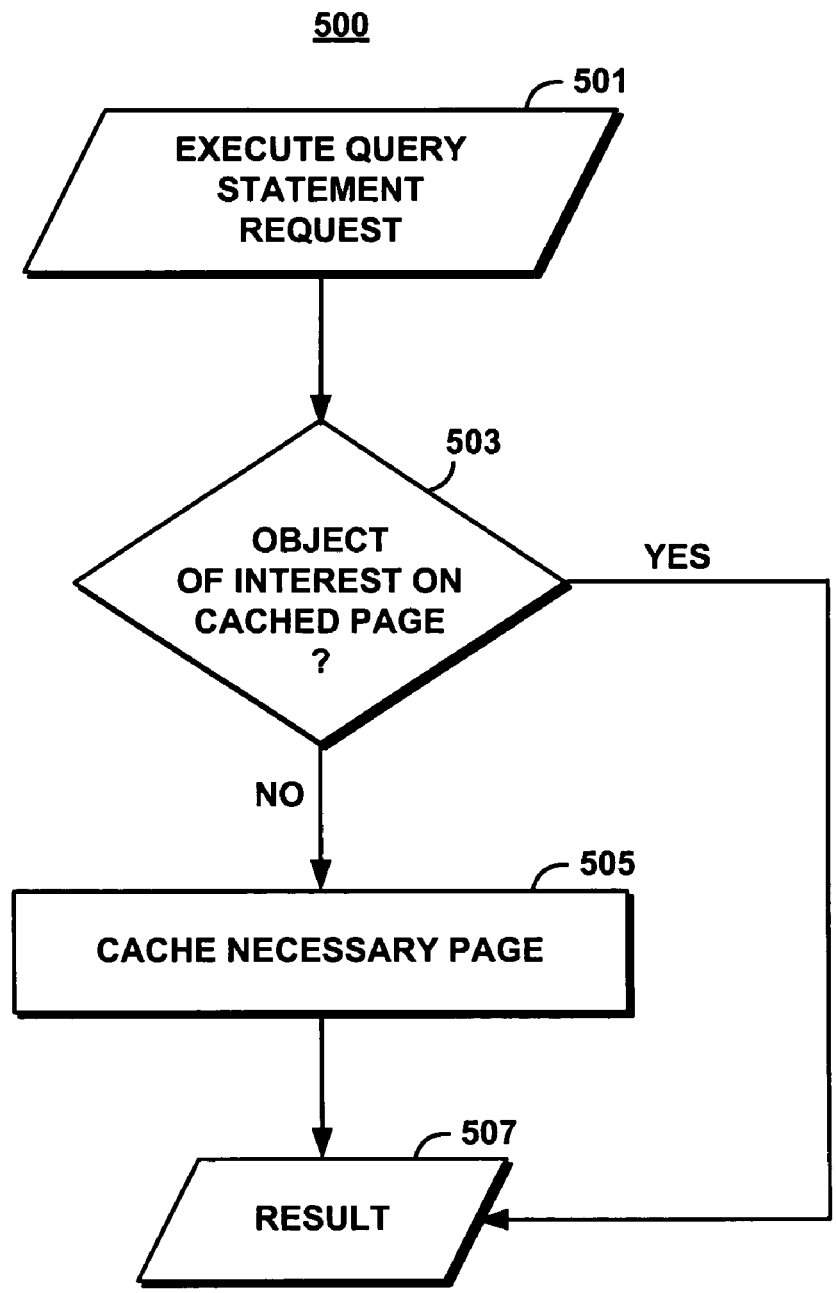
FIG. 5 is a process flowchart illustrating a further method for query statement execution utilizing the present invention.

FIG. 5 shows that when executing a query statement (step 501), the priming module 225 determines whether the page containing the object of interest such as, for example, a data row or index entry is in cache 120. If not, the page is read into cache 120 by the priming module 225. If the priming process had already retrieved this page, the page is read into the cache by the execution process (step 505), for returning a result (step 507).

Figure 6:
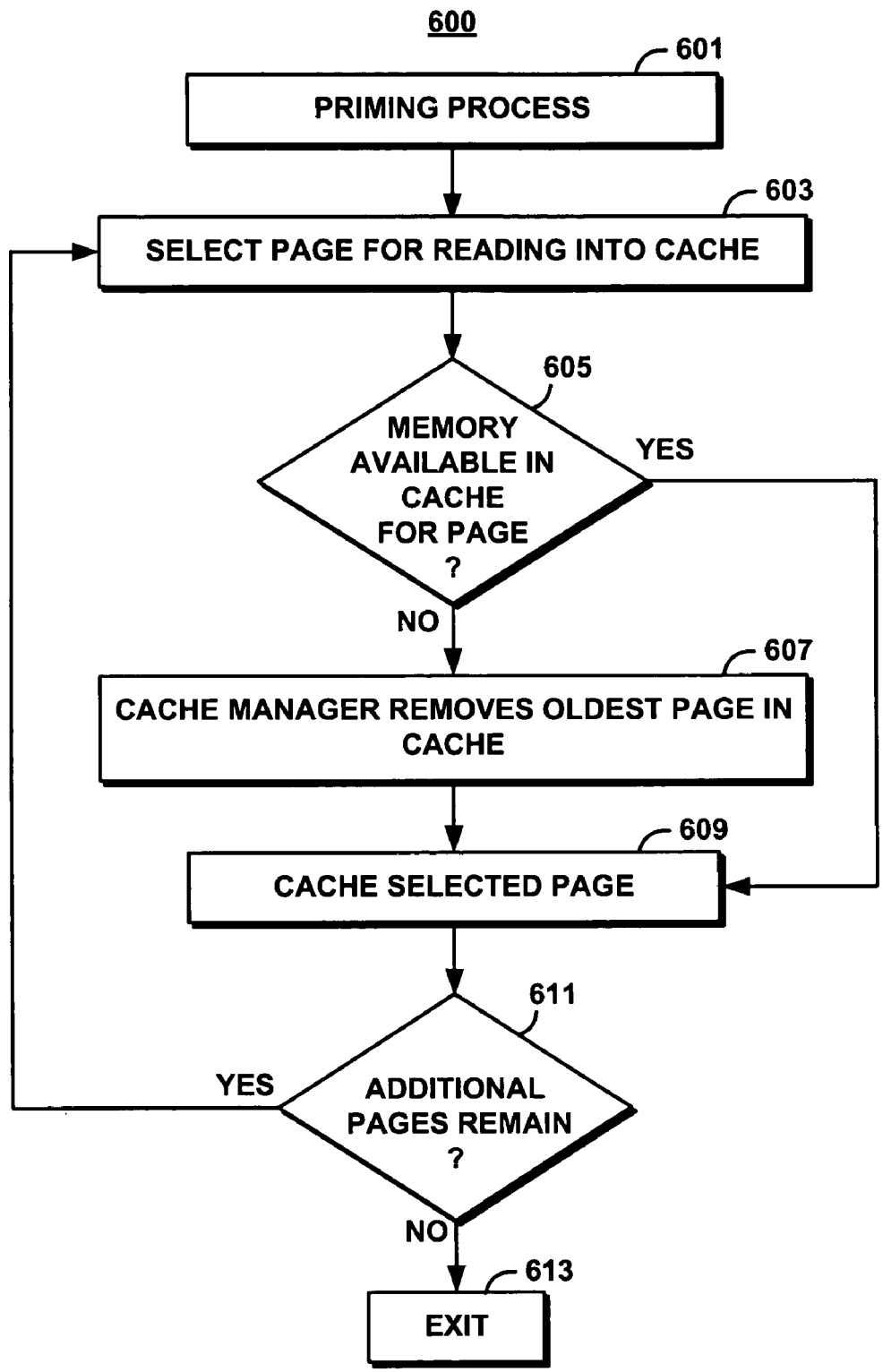
FIG. 6 is a process flowchart illustrating a method for retrieving pages according to the priming process of the present invention.

FIG. 6 illustrates the priming process (step 601) for retrieving data into the cache in parallel with query statement execution. Pages are read into cache 120 according to the priming access plan. A page is selected for reading into cache 120 (step 603). The cache manager 12 determines whether memory is available in cache 120 for the selected page (decision step 605). If the maximum size of the cache 120 is reached or concurrent processes need cache space, new pages are read into the cache 120 and older pages are removed. The cache manager 12 removes the oldest page in the cache (step 607). The priming module 225 caches the selected page (step 609). The priming module 225 determines whether additional pages remain for processing (decision step 611). If yes, the priming module 225 returns to step 603. Otherwise, processing exits (step 613).

This removal of older pages is not part of the priming process as such. The priming process only brings pages into the cache 120. Every cache has its own page retention mechanism that works independently of the priming process. The older pages are replaced according to algorithms used by the cache manager 12.

It is to be understood that the specific embodiments of the invention that have been described are merely illustrative of certain applications of the principle of the present invention. Numerous modifications may be made to the system and method for just-in-time priming of a database cache described herein without departing from the spirit and scope of the present invention. Moreover, while the present invention is described for illustration purpose only in relation to structured query language (SQL), it should be clear that the invention is applicable as well to, for example, any language that is structured or semi-structured.

What is claimed is:

1. A method for managing a database containing a plurality of data pages and index pages, the method comprising:
   providing a memory;
   providing a processor configured to execute instructions stored on the memory for,
      receiving a request to access data from one or more of the data pages and the index pages of the database;
      generating an access plan for the request;
      determining a set of data pages and index pages for retrieval pursuant to the access plan for the request;
      generating a priming retrieval retrieving a priming set of data pages and index pages into a cache in response to receiving the request, the priming retrieval to eliminate a need for reorganization of the database due to a deteriorating clustering ratio, wherein the priming set is a superset of the determined set of data pages and index pages, the superset comprising more pages than required to satisfy the request, wherein the priming retrieval accounts for an occurrence of sequential patterns of one or more of data pages and index pages; and
   executing the request with a request scan obtaining the data pages and index pages for the request pursuant to the access plan in response to receiving the request, the request scan performed substantially concurrently with the priming retrieval, wherein the request scan obtains the data pages and index pages for the request by scanning the data pages and the index pages of the priming set in the cache.

2. The method according to claim 1, further comprising, in response to not finding data pages and index pages while scanning the data pages and the index pages that are retrieved by the priming retrieval, retrieving additional pages.

3. The method according to claim 1, further comprising coordinating retrieval of the data pages and index pages of the priming set such that the data pages and index pages of the priming set are retrieved prior to obtaining the set of data pages and index pages generated pursuant to the access plan for the request.

4. The method according to claim 1, further comprising generating a separate access plan for the priming retrieval.

5. The method according to claim 1, wherein the priming retrieval is based on data rows and index entries of the request.

6. A computer program product having program codes stored on a computer-usable storage medium for managing a database containing a plurality of data pages and index pages, the computer program product comprising:
   receiving a request to access data from one or more of the data pages and the index pages of the database;
   generating an access plan for the request;
   determining a set of data pages and index pages for retrieval pursuant to the access plan for the request;
   generating a priming retrieval retrieving a priming set of data pages and index pages in response to receiving the request, the priming retrieval to eliminate a need for reorganization of the database due to a deteriorating clustering ratio, wherein the priming set is a superset of the determined set of data pages and index pages, the superset comprising more pages than required to satisfy the request wherein the priming retrieval accounts for an occurrence of sequential patterns of one or more of data pages and index pages;
   reading the data pages and the index pages that are selected by the priming retrieval, into a cache;
   obtaining the data pages and index pages of the access plan for the request with a request scan by scanning the data pages and the index pages of the priming set in the cache in response to receiving the request; and
   executing the request according to the request access plan substantially concurrently with determining the priming set of data pages and index pages wherein the request execution pauses in response to detecting that the priming retrieval has yet to retrieve one or more of a data page and an index page required to execute the request.

7. The computer program product according to claim 6, further comprising coordinating retrieval of the data pages and index pages of the priming set such that the data pages and index pages of the priming set are retrieved prior to obtaining the set of data pages and index pages generated pursuant to the access plan for the request.

8. The computer program product according to claim 6, further comprising, in response to not finding data pages and index pages while scanning the data pages and index pages that are retrieved by the priming retrieval, retrieving additional pages.

9. The computer program product according to claim 6, further comprising generating a separate access plan for the priming retrieval.

10. The computer program product according to claim 6, wherein the priming retrieval is based on data rows and index entries of the request.

11. A system for managing a database that includes a database table containing a plurality of data pages and index pages, the system comprising:

a relational data system for receiving a request to access data any from one or more of the data pages and the index pages of the database;

an optimizer module for generating an access plan for the request;

a data and index manager for determining a set of data pages and index pages for retrieval pursuant to the access plan for the request;

a priming module for generating a priming retrieval retrieving a priming set of data pages and index pages in response to receiving the request, the priming retrieval to eliminate a need for reorganization of the database due to a deteriorating clustering ratio, wherein the priming set is a superset of the set of data pages and index pages generated pursuant to the access plan, the superset comprising more pages than required to satisfy the request, wherein the priming retrieval accounts for an occurrence of sequential patterns of one of data pages and index pages;

a cache manager for reading the priming set of data pages and the index pages into a cache; and the optimizer module for executing the request with a request scan in response to receiving the request, the request scan scanning the data pages and the index pages in the cache that are retrieved by the priming retrieval wherein the priming set is retrieved substantially concurrently to scanning data pages and index pages for the request.

12. The system according to claim 11, wherein if the data pages and the index pages are not found in the cache, the optimizer module retrieves additional pages.

13. The system according to claim 11, wherein the optimizer module further generates a separate access plan for the priming retrieval.

14. The system according to claim 11, wherein the priming retrieval is based on data rows and index entries of the request.

* * * * *